Feb. 9, 1937.  F. J. SHEPARD, JR., ET AL  2,070,095
FLOOR TRUCK
Filed Nov. 12, 1934  4 Sheets-Sheet 1

Inventors.
Frederick J. Shepard Jr.
Nathaniel Warshaw
by Heard Smith & Tennant
Attys.

Feb. 9, 1937. F. J. SHEPARD, JR., ET AL 2,070,095
FLOOR TRUCK
Filed Nov. 12, 1934 4 Sheets-Sheet 2

Inventors.
Frederick J. Shepard Jr.
Nathaniel Warshaw
by Heard Smith & Tennant.
Attys.

Feb. 9, 1937.  F. J. SHEPARD, JR., ET AL  2,070,095
FLOOR TRUCK
Filed Nov. 12, 1934  4 Sheets-Sheet 3

Inventors.
Frederick J. Shepard Jr.
Nathaniel Warshaw
by Heard Smith & Tennant.
Attys.

Feb. 9, 1937. F. J. SHEPARD, JR., ET AL 2,070,095
FLOOR TRUCK
Filed Nov. 12, 1934 4 Sheets-Sheet 4
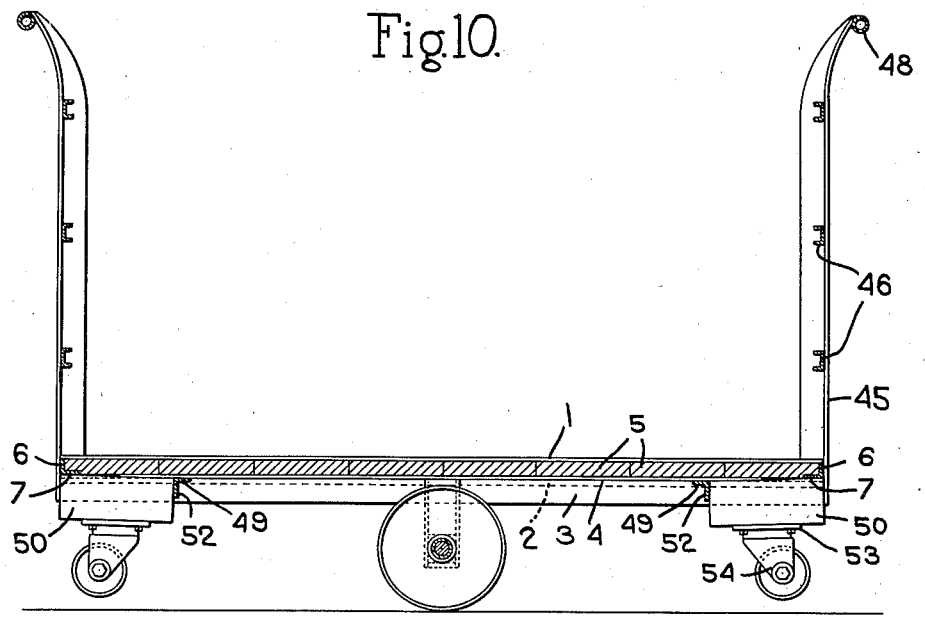
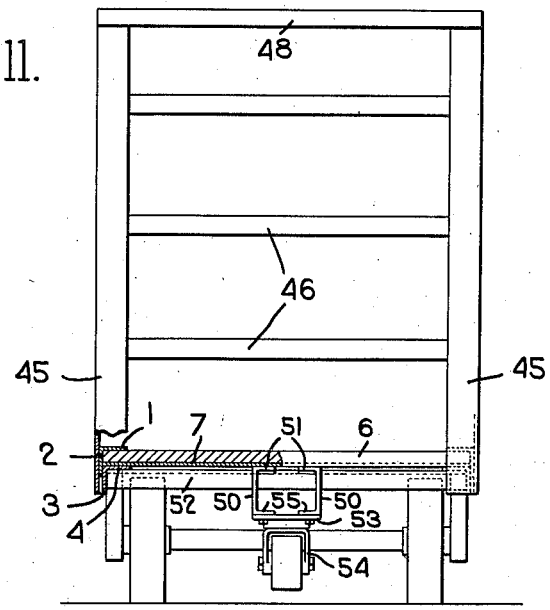
Inventors.
Frederick J. Shepard Jr.
Nathaniel Warshaw
by Heard Smith & Tennant.
Attys.

Patented Feb. 9, 1937

2,070,095

UNITED STATES PATENT OFFICE 2,070,095

FLOOR TRUCK

Frederick J. Shepard, Jr., West Newton, and Nathaniel Warshaw, Mattapan, Mass., assignors to Lewis-Shepard Company, Watertown, Mass., a corporation of Massachusetts Application November 12, 1934, Serial No. 752,649

5 Claims. (Cl. 280—49)

This invention relates to improvements in floor trucks which comprise a flat load supporting means or deck to receive the load and which is provided with rotatable supporting means including casters to enable the truck to be pushed from one place to another.

Floor trucks of this type have usually comprised a series of floor boards bolted, nailed or screwed at their ends to wooden sills fastened to metal sills to which the running gear is also bolted. No wood is sufficiently hard to prevent enlargement of the screw holes or the bolt holes, through which the bolts pass, by reason of the strains put upon the screws or bolts during the use of the truck and as the holes become enlarged, or the screws or bolts loosened, in use, the whole truck becomes shaky.

One of the principal objects of the invention is to provide a floor truck having a deck comprising floor boards bound by a frame having channel-shaped side members, closely embracing the ends of the floor boards, connected by transverse metal girders welded at their ends to the side frames, thus enclosing the floor boards both at the ends and sides thereof, thereby entirely eliminating bolts, nails, rivets, screws, etc., which have heretofore been used for securing the floor boards to the wooden or metal side girders. By reason of this construction the floor boards are enabled to move laterally within the limit of their confinement, and expansion and contraction of the floor boards under changes in atmospheric conditions is permitted without the splitting of the boards as is the case when the boards are nailed or permanently attached to the girders, so that they cannot "float" in response to atmospheric changes.

A further object of the invention is to provide a floor truck deck comprising floor boards enclosed in a rectangular integral steel frame in which the side members are fabricated from longitudinally overlapping structural steel angle bars to provide oppositely disposed channels which will fit tightly upon the ends of the floor boards, with the overlapped members of the angle bars rigidly secured together to provide a reenforced rigid construction which will effectively resist bending under the weight of the load even though relatively light angle bars are employed. By reason of this construction built-up channels may be made of structural steel angles of any desired size to provide side frames of any desired strength and to fit floor boards of any desired thickness.

A further object of the invention is to provide angle iron cross girders connected preferably by welding to the flanges of the side bar channels and closely engaging the edges of the outer floor boards, and holding the ends of the floor boards tightly in engagement with the bottoms or webs of the respective channels, thereby causing the floor boards to reenforce the frame and also protecting the edges of the outermost floor boards against abrasion or splitting under hard use.

A further object of the invention is to provide a floor truck with a deck of such rigid construction as to permit the casters to be secured directly to the floor boards. This is accomplished in the present invention by reason of the fact that the vertical flanges of the channels which are formed by overlapping angle bars fit tightly upon the ends of the floor boards and together with the metal end girders form a floor of such rigidity that when the caster wheels are secured directly to the floor boards, no dangerous strain is imposed on any particular floor board, whereas in the usual forms of wooden floor trucks such fastening of the casters to one of the floor boards would tend to push the board off the wooden sill as the board fastenings become loose, or at least cause such movement of the floor board to which the caster was attached as to interfere with the proper operation of the truck.

A further object of the invention is to provide an integral chassis, having channel-shaped side frames embracing the ends of the floor boards and connected by transverse girders closely engaging the outermost edges of the floor boards, with hangers, preferably of channel form, secured, preferably by welding, to the horizontal and desirably also to the vertical flanges of the lower angle bars of the side frame at a distance from one end of the truck, with wheels rotatably mounted upon an axle extending through said hangers, and with caster wheels suitably mounted adjacent the other end, or if the hangers are placed midway of the truck, as in tilting floor trucks, with casters of smaller diameter mounted in proximity to the ends of the truck.

A further object of the invention is to provide an integral frame or chassis construction having a push bar, which may be in the form of an end rack, having uprights curved outwardly at their upper ends and connected together and at their lower ends provided with attaching means secured preferably by welding both to the ends of the side bars and to the horizontal girder.

A further object of the invention is to provide a means for attaching the lower ends of the uprights of the push bar to the frame comprising steel sockets located at the corner of the frame and welded both to the side frames and to the cross girder at such corners, thereby strengthening the corner structure of the frame as well as providing sockets to receive the lower ends of the push bar, or the lower ends of suitable stakes for retaining the load in place.

A further object of the invention is to provide a floor truck of the character above defined which can be economically constructed, which can be made of any desired capacity, and which may be equipped with suitable wheels and/or casters to provide a tilting truck, a balanced truck, or a non-tilting truck, and which can be so made as to position its deck at any desired distance from the floor.

Another object of the invention is to provide floor trucks of the character described, and particularly the tilting type of floor trucks, with novel means for mounting the relatively small casters upon the frame, and a further object of the invention is to provide a tilting floor truck with means for so mounting the relatively small caster or casters that as the deck is tilted to cause the caster wheel to engage the floor, the axis about which the caster swivels will be perpendicular to the floor.

These and other objects and features of the invention will more fully appear from the following description and the accompanying drawings and will be particularly pointed out in the claims.

Selective types of floor trucks embodying the present invention are illustrated in the accompanying drawings, in which, Fig. 1 is a perspective view of a non-tilting truck embodying the invention;

Fig. 10 is a longitudinal sectional view of a tilting floor truck showing a preferred means of mounting the caster brackets; and, Fig. 11 is an end view of the floor truck shown in Fig. 10, a portion of the deck being broken away and the floor board and frame members shown in section.

One of the principal features of the invention which is common to all of the floor truck constructions illustrated herein comprises a deck having floor boards tightly bound by an integral steel frame in such manner as to avoid the use of bolts, rivets, nails or screws, for securing the boards to the side frames and in which the floor boards clamped by the frame increase the rigidity against distortion.

Another feature of the invention which is common to all of said floor truck constructions comprises channel-shaped fabricated steel side frames each comprising longitudinally overlapping structural angle bars connected together, preferably by welding, either continuously or at intervals, in such manner as to provide channels between the horizontal flanges to receive the ends of the floor boards, with horizontal end girders abutting the edges of the outermost floor boards. The channel side frames may thus be fabricated so that the horizontal flanges will engage tightly the upper and lower surfaces of floor boards of any desired thickness, with the ends of the floor boards engaging the vertical webs of the respective channels, thereby increasing the rigidity of the frame against distortion.

Desirably the upper faces of the floor boards are rabbeted to a depth corresponding to the thickness of the horizontal flange of the upper angle bar, so that the deck presents a smooth flat unobstructed surface having no possibility of floor board fastenings working loose to damage the merchandise transported on the truck.

Figure 1:
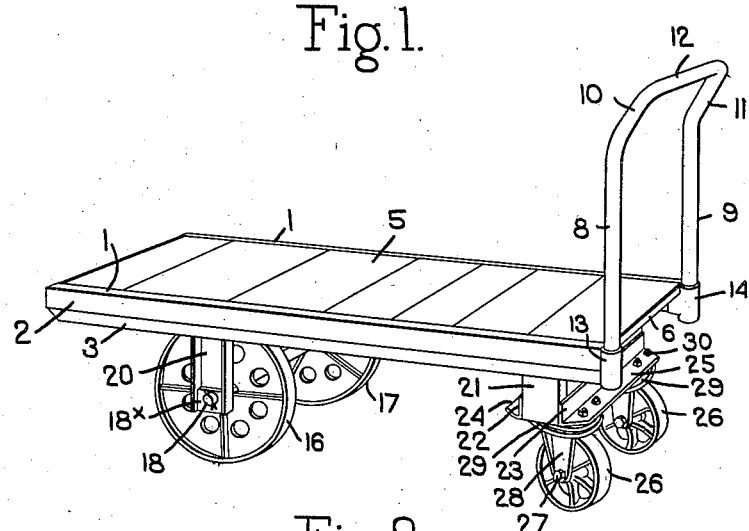
Figure 2:
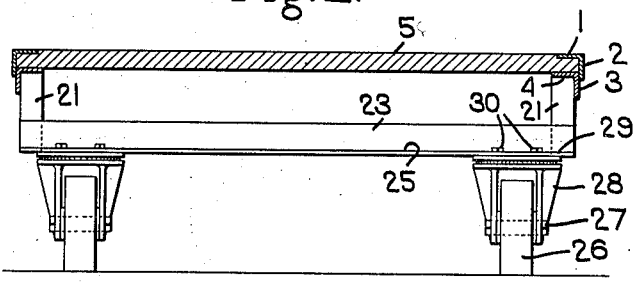
Fig. 2 is a transverse vertical sectional view midway of the length of the truck, viewed toward the forward end, illustrating the manner in which the front casters are secured to the chassis, the push bar being omitted.
Figure 3:
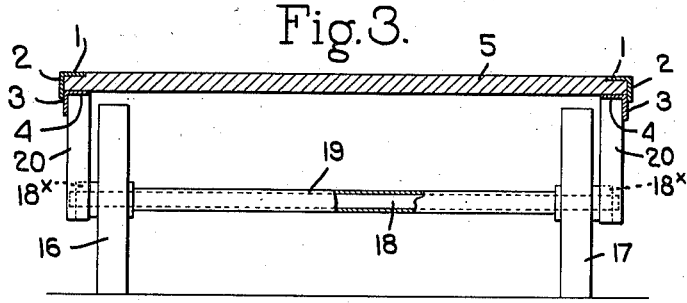
Fig. 3 is a transverse vertical sectional view midway of the length of the truck, viewed toward the rear of the truck, showing the manner in which the larger wheels are mounted upon channel-shaped hangers secured at their upper ends to the flanges of the lower angle bars of the side frame.

The deck construction in the embodiments of the invention illustrated in Figs. 1, 2, and 3, comprises an integral frame having reversely arranged channel-shaped side frames fabricated from an upper angle bar having a horizontal flange 1 and a vertical flange 2, which overlaps the vertical flange 3 of the lower angle bar, the horizontal flange 4 of which extends in parallelism with the horizontal flange 1 of the upper angle bar. The distance of overlap of the vertical flange 2 over the vertical flange 3 may be varied in fabricating the side frame to provide a channel which will tightly embrace the ends of the floor boards 5. Desirably the end portions of the floor boards are rabbeted to a depth equal to the thickness of the horizontal flanges 1 of the upper angle bar of the side frame thereby to provide a continuous smooth and flat surface the full width and length of the truck.

The side frames are connected by transverse end girders, preferably in the form of angle irons, the vertical flanges 6 of which engage the outer edges of the outermost floor boards, and the horizontal flanges 7 of which preferably are seated in the rabbeted under-edges of the outermost floor boards. The transverse girders desirably extend into the channels of the side frames and abut against the vertical flange 2 of the uppermost angle bar and are secured, preferably by welding, to the horizontal flange 4 and desirably also to the vertical flange 2 of the side bar.

In constructing the deck the floor boards are placed firmly edge to edge and the transverse end girders fitted tightly against the outer edges of the outermost floor boards. By reason of this construction the steel transverse end girders protect the outer edges of the outermost floor boards from injury or splintering and by reason of the firm abutment of the ends of the floor boards, which fit into the channels, against the bases or webs of the channels, the floor boards reenforce the deck against lateral strain.

In floor truck constructions push bars are usually secured to one or both ends of the truck to enable it to be properly transported and in the present invention means are provided for securing the push bars to the corners of the frame in such manner as to reenforce the corners of the frame and thereby further increase the rigidity of the integral deck construction.

Figure 4:
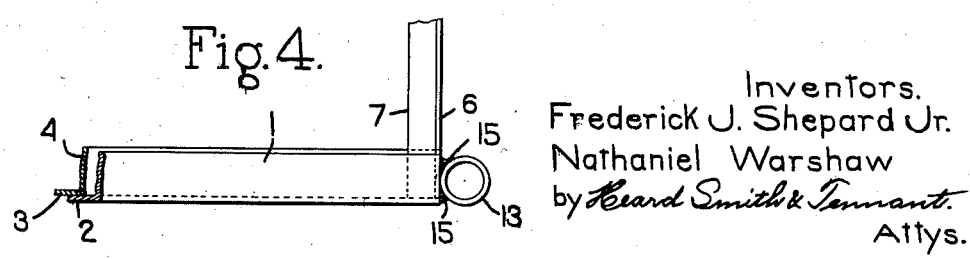
Fig. 4 is an enlarged plan view showing one of the sockets for the push bar or stake welded to the side frame and transverse girder.

In the construction illustrated in Fig. 1, and in detail in Fig. 4, the push bars comprise uprights 8 and 9 having forwardly bent portions 10 and 11 which are connected by a preferably horizontal integral portion 12 forming a handle. The lower ends of the uprights 8 and 9 preferably are seated in cylindrical socket members 13 and 14, which may be steel pipe sections, firmly secured by welding material 15 to the vertical flanges 2 and 3 of the side frames and to the vertical flanges 6 of the transverse end girder.

The construction shown in Figs. 1, 2, and 3, comprises a non-tilting truck having large rear wheels 16 and 17, preferably having roller bearings and journaled upon an axle 18 which is mounted in suitable blocks 18x fixedly secured in the lower ends of structural steel, preferably channel-shaped hangers 20, the upper ends of which abut against and are welded or otherwise rigidly secured to the vertical flanges 3 of the lower angle bars of the side frame and preferably are also welded to the horizontal side flanges 4 of the lower angle bars of the side frame. A spacing sleeve 19 surrounding the shaft 18 and abutting at its ends against the inner faces of the hubs of the wheels 18 maintains them in properly spaced relation.

In the construction shown in Figs. 1 to 3 the channel-shaped hangers face outwardly and the flanges of the channels are welded to the vertical flanges 3 of the side frame. By reason of this construction the blocks in which the axle 18 is mounted are positioned within the channels of the hangers so that the ends of the axle 18 do not project beyond the vertical planes of the side frames.

At the front end of the truck similar structural steel hangers 21 are provided, but are preferably reversely arranged so that the web of the channel will be secured to the vertical flange 3 of the lower side frame members and the upper ends preferably welded to the horizontal flanges 4 of the side frames. Angle bars 22 and 23 desirably are welded or otherwise rigidly secured to the front and rear flanges of the channel-shaped hangers 21 so that their horizontal flanges 24 and 25 lie in the same plane and form rigid members to which suitable caster assemblies may be secured.

The casters comprise wheels 26, preferably having axles 27 which are mounted in ball bearings in the lower ends of the legs of brackets 28 having flat circular upper ends which are swiveled in plates 29 which are secured to the respective horizontal flanges 24 and 25 by bolts 30. Desirably anti-friction bearings, such as roller bearings, are interposed between the base plates and the circular upper ends of the caster brackets 29. By reason of this construction the casters swivel very easily and enable the truck to be steered with ease, either when pushed or pulled.

Figure 5:
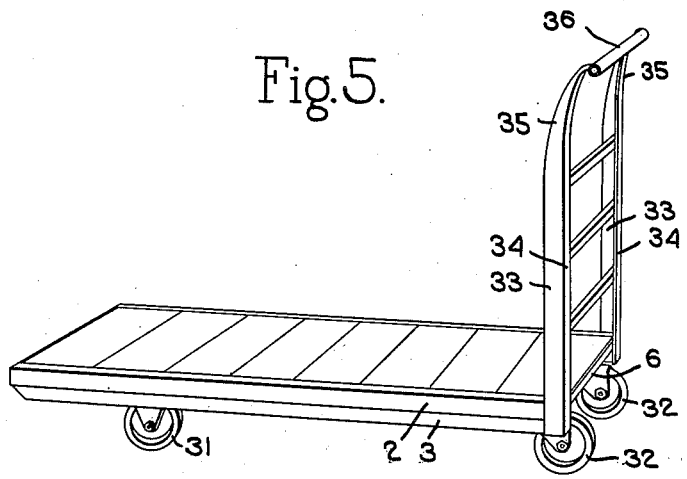
Fig. 5 is a perspective view of a low deck floor truck embodying the invention in which the rotatable supporting means comprises only casters.
Figure 6:
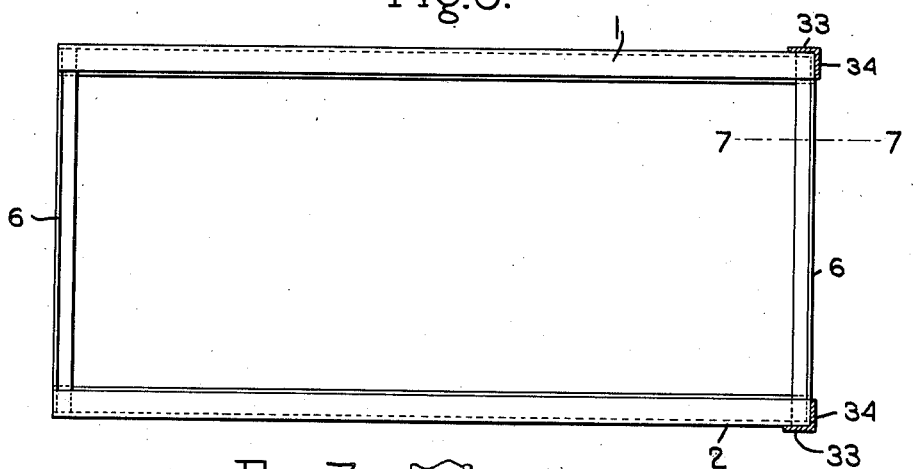
Fig. 6 is a plan view of the frame of the deck of the floor truck illustrated in Fig. 5, showing the manner in which the uprights of the push bar or rack embrace and are secured to the ends of the side frames and to the end girders.
Figure 7:
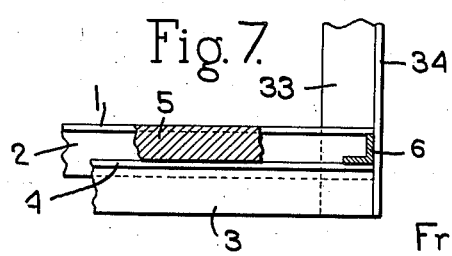
Fig. 7 is an enlarged detail vertical cross sectional view on line 7—7 Fig. 6, portions of the floor board being broken away.

In the construction illustrated in Figs. 5, 6, and 7, a low deck floor truck is shown having an integral frame construction of the character above described supported upon front swiveled casters 32 and rear stationary casters 31 the bases of which may be bolted or otherwise secured directly to the side frames.

The truck is provided with a push bar or push bars to enable the truck to be conveniently transported from one place to another. In the construction shown in Fig. 5, the push bar preferably comprises angle bar uprights, the flanges 33 and 34 of which enclose the corners of the integral steel frame and are welded at their lower ends to both the vertical flanges 2 and 3 of the side frames and to the vertical flange 6 of the transverse end girder, thereby reenforcing the corners of the side frames.

The upper portions 35 of the uprights preferably are bent forwardly and are connected together by a horizontal bar, or preferably tubular member 36, such as a piece of steel pipe which is welded or otherwise secured to the upper ends of the uprights. The uprights are also connected together preferably by channel bars which are welded at their ends to the flanges 33 and 34 of the uprights, thus forming end racks and further increasing the rigidity of the construction.

Figure 8:
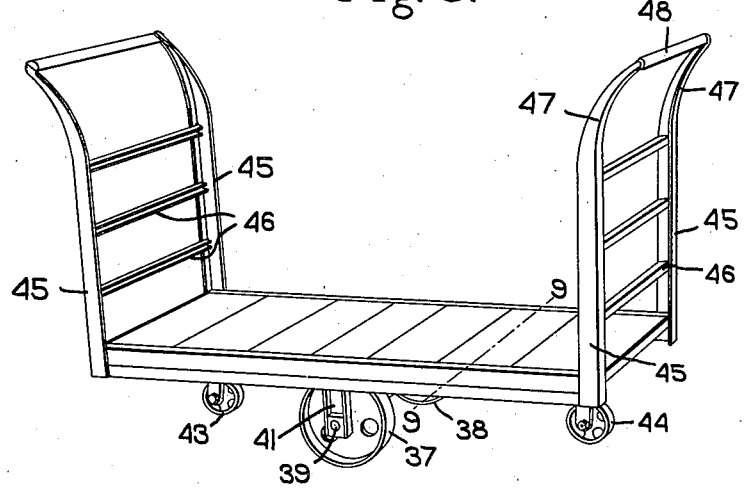
Fig. 8 is a perspective view of a tilting truck embodying the invention.
Figure 9:
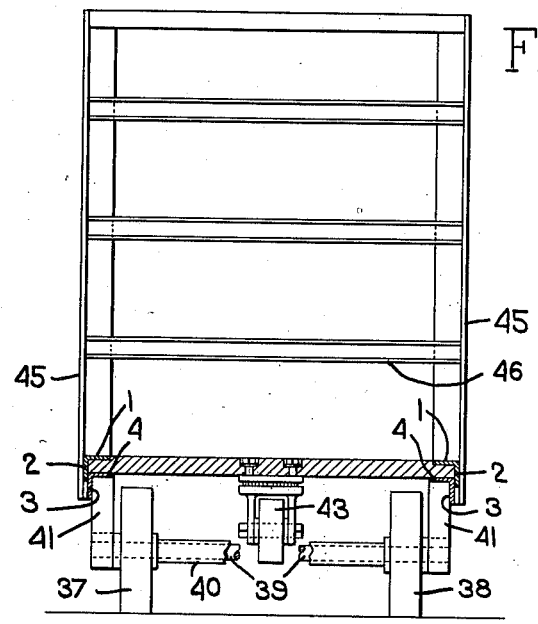
Fig. 9 is a vertical sectional view on line 9—9 Fig. 8 viewed from the left toward the right, the axle and spacing sleeve for the central wheels being broken away to show more clearly the manner of attachment of one of the casters to the floor board.

The construction illustrated in Figs. 8 and 9 is of the tilting or balance type. The deck construction is of the character above described. Large load supporting wheels 37 and 38 are rotatably journaled upon a shaft 39 which is mounted in blocks secured within the channels of, and preferably welded to, channel-shaped hangers 41 located midway of the length of the truck and which abut respectively against the horizontal flanges 4 of the lower angle bars of the side frames, and preferably are welded thereto and to the vertical flanges 3 of said lower angle bar. A sleeve 40, surrounding the shaft 39 and abutting at its ends against the hubs of the wheels 37 and 38, maintains the wheels in properly spaced relation, as above described. In this construction swiveled caster wheels 43 and 44 may be bolted or otherwise mounted on the floor boards midway of the width of the truck and between the center of the truck and the respective ends thereof, as illustrated in Fig. 9. Such swiveled casters may be of the character above described.

In the construction shown in Figs. 8 and 9, push bars in the form of racks are provided at each end of the truck and desirably comprise angle iron uprights 45 which fit upon the corners of the side frames and are welded to the side frames and to the transverse end girders in the manner above described, with a plurality of transverse angle bars 46 welded to the uprights 45. The upper end portions 47 of the uprights are bent outwardly and are connected by suitable handle members 48 which preferably are welded to the upper ends of the uprights.

In the construction shown in Figs. 10 and 11, a heavier duty type of tilting floor truck of the character illustrated in Figs. 8 and 9, is shown, with novel means for securing the casters to the frame. In this construction the side frames are fabricated from longitudinally overlapping steel angle bars rigidly connected together to provide oppositely disposed channels which will fit tightly on the ends of the floor boards. The side frames are connected by transverse angle bar end girders, the horizontal flanges 7 of which rest upon the horizontal flanges 4 of the lower members of the side girders and are secured thereto preferably by welding, as above described. Supplemental transverse angle iron girders are located short distances from the end girders and their horizontal flanges 49 are secured to the under faces of the horizontal flanges 4 of the side frames. These supplemental girders not only serve to strengthen the frame, but also provide means to which caster-supporting members of any desired depth may be secured.

In the preferred construction illustrated the caster-supporting members comprise short reversely arranged channel bars 50, the upper flanges 51 of which are secured at one end, preferably by welding, to the horizontal flange 7 of the transverse end girder, and the ends of which channel bars desirably are secured by welding to the vertical flanges 52 of the supplemental transverse girders. The base plate 53 of a swiveled caster construction 54 is bolted to the lower flanges 55 of the channel bars. By thus securing the outer end of the channel-shaped caster-supporting members to the under face of the horizontal flange 7 of the end girders and the other ends thereof to the vertical flange 52 of the supplemental girder, the lower plane of the lower face of the horizontal flange 4 of the side frame, the caster-supporting channel members 50 incline slightly downwardly toward the center of the truck, and this inclination is such that when the deck of the truck is tilted downwardly at either end so that the casters engage the floor, the vertical axes, about which the casters swivel, will be perpendicular or substantially perpendicular to the plane of the floor, thereby facilitating the swiveling movement of the caster during the maneuvering of the truck.

It will be understood, however, that any other type of caster than those above described may be employed. It will also be understood that the particular embodiments of the invention specifically disclosed herein are of an illustrative character, and that various changes in form, construction and arrangement of parts may be made within the spirit and scope of the following claims, and particularly that the fabricated integral frame may be composed of angle bars having flanges of suitable width and thickness to provide the necessary strength for the purpose to which the floor truck is to be subjected.

It will be particularly noted that by thus fabricating the side frames, the associated vertical flanges of the angle bars which are welded together present a structure of such rigidity that much thinner stock may be employed to provide the desired strength than would be required for usual channel-shaped side bars. As a consequence, the weight of the truck for a given capacity is materially reduced by the present invention, while the rigidity of the deck is materially increased.

By reason of the present invention floor trucks can be economically constructed by the use of standard steel structural bars and the parts thereof readily and rigidly assembled at a minimum cost, thereby providing a truck which can be sold at substantially the same price of wooden floor trucks heretofore made, but of superior construction, of longer life and which avoid the disadvantages of the older types of trucks above mentioned.

Having thus described the invention, what is claimed as new, and desired to be secured by Letters Patent, is:

1. A floor truck having a deck comprising wooden floor boards bounded by an integral all-steel frame structure having side members each fabricated from associated longitudinally extending angle bars having their horizontal flanges extending in parallelism and their downwardly extending vertical flanges overlapped and welded together to provide a channel embracing the ends of said wooden floor boards, transverse steel angle bar end girders extending into the channels of said side members and welded at their ends to said side members, structural steel wheel hangers of channel shape located at a distance from one end of said deck having their upper ends abutting and welded to the horizontal flanges of said lower angle bar and their flanges welded to the vertical flanges of said lower angle bar, journal boxes mounted in the lower ends of said wheel hangers between the flanges of the channels and welded thereto, a shaft extending through said journal boxes, wheels mounted upon said shaft.

2. A floor truck having a deck comprising floor boards bound by an integral all-steel frame structure comprising side members each fabricated from associated longitudinally overlapping angle bars welded together with their horizontal flanges extending in parallelism to provide a channel embracing and tightly fitting the ends of said floor boards, angle iron end girders, engaging respectively the edges of the outermost floor boards and welded to said side members, supplemental transverse girders spaced from said end girders and welded at their ends to said side members with their vertical flanges extending downwardly, structural steel wheel-hangers having their upper ends engaging the horizontal and vertical flanges of the lower angle bar of the respective side frames midway of the length of the frame and welded to said vertical and horizontal flanges, an axle mounted in the lower ends of said hangers, wheels journaled upon said axle, caster-supporting means mounted upon and welded to said end and supplemental girders, and casters mounted on said caster-supporting means.

3. A floor truck having a deck comprising floor boards bound by an integral all-steel frame structure comprising side members each fabricated from associated longitudinally overlapping angle bars welded together with their horizontal flanges extending in parallelism to provide a channel embracing and tightly fitting the ends of said floor boards, angle iron end girders, engaging respectively the edges of the outermost floor boards and welded to said side members, supplemental transverse girders spaced from said end girders and welded at their ends to said side members with their vertical flanges extending downwardly, structural steel wheel-hangers having their upper ends engaging the horizontal and vertical flanges of the lower angle bar of the respective side frames midway of the length of the frame and welded to said vertical and horizontal flanges, an axle mounted in the lower ends of said hangers, wheels journaled upon said axle, caster-supporting means of such depth as to position the caster in the desired distance from the floor secured to said end and supplemental girders in such downwardly and inwardly inclined position as to bring the axis about which the caster swivels into substantially vertical position relatively to the plane of the floor when the caster is in engagement with the floor.

4. A floor truck having a deck comprising floor boards bound by an integral all-steel frame structure comprising side members each fabricated from associated longitudinally overlapping angle bars welded together with their horizontal flanges extending in parallelism to provide a channel embracing and tightly fitting the ends of said floor boards, angle iron end girders, engaging respectively the edges of the outermost floor boards and connected to said side members, supplemental transverse girders spaced from said end girders and welded at their ends to said side members with their vertical flanges extending downwardly, structural steel wheel-hangers having their upper ends engaging the horizontal and vertical flanges of the lower angle bar of the respective side frames midway of the length of the frame and welded to said vertical and horizontal flanges, an axle mounted in the lower ends of said hangers, wheels journaled upon said axle, caster-supporting means comprising channel bars having their horizontal flanges welded to the horizontal flanges of said end girders and welded at their other ends to the downwardly extending vertical flanges of said transverse girders, and casters having their bases secured to their lower horizontal flanges of said channel bars.

5. A floor truck having a deck comprising floor boards bound by an integral all-steel frame structure comprising side members each fabricated from associated longitudinally overlapping angle bars welded together with their horizontal flanges extending in parallelism to provide a channel embracing and tightly fitting the ends of said floor boards, angle iron end girders, engaging respectively the edges of the outermost floor boards extending into said channels and welded to said side members, supplemental transverse angle iron girders spaced from said end girders engaging at their ends the under faces of the horizontal flanges of the lower members of the side frames and welded to said side frames with their vertical flanges extending downwardly, structural steel wheel-hangers having their upper ends engaging the horizontal and vertical flanges of the lower angle bar of the respective side frames midway of the length of the frame and welded to said vertical and horizontal flanges, an axle mounted in the lower ends of said hangers, wheels journaled upon said axle, channel bar caster-supporting members having their horizontal flanges welded at one end to the horizontal flanges of the end girders and to the vertical flanges of the supplemental girders in an inwardly inclined position, and casters having their bases secured to the lower horizontal flanges of said channels.

FREDERICK J. SHEPARD, Jr.
NATHANIEL WARSHAW.